United States Patent [19]

Katsoulis et al.

[11] Patent Number: 5,391,638

[45] Date of Patent: Feb. 21, 1995

[54] ORGANOSILOXANE COMPOUNDS CONTAINING POLYOXOMETALATE GROUPS

[75] Inventors: Dimitris E. Katsoulis, Midland; John R. Keryk, Rhodes, both of Mich.

[73] Assignee: Dow Corning Corporation, Midland, Mich.

[21] Appl. No.: 172,787

[22] Filed: Dec. 27, 1993

[51] Int. Cl.$^6$ ............................................. C08G 79/14
[52] U.S. Cl. ..................................... 525/389; 525/475; 528/395; 528/31; 528/32; 528/33; 556/10; 556/57
[58] Field of Search ................. 525/475, 389; 528/395, 528/31, 32, 33; 556/10, 57

[56] References Cited

U.S. PATENT DOCUMENTS

| | | | |
|---|---|---|---|
| 2,863,891 | 12/1958 | Granchelli et al. | 556/10 |
| 2,940,951 | 6/1960 | Ruskin | 528/395 |
| 4,157,978 | 6/1979 | Llenado | 556/10 |
| 4,292,253 | 9/1981 | Ozin et al. | 556/57 |
| 4,334,051 | 6/1982 | Yajima et al. | 528/25 |
| 4,424,332 | 1/1984 | Panster et al. | 528/30 |
| 5,286,885 | 2/1994 | Goetz et al. | 549/531 |

OTHER PUBLICATIONS

G. Tsigdinos "Heteropoly Compounds of Molybdenum & Tungsten", Topics in Current Chem., 1978, 76, p. 1.
V. Day & W. Klemperer, "Science," 1985, vol. 228, p. 553.
W. Knoth, "J. Am. Chem." Soc., 101:3, 759–760 (1979).
P. Judeinstein et al. "J. Chem. Soc.," Dalton Trans. (1991) pp. 1991–1997.
P. Judeinstein, "Chem. of Materials", 4, 4–7 (1992).
N. Ammari et al. (New J. Chem. 15, 607–608 (1991).
M. T. Pope, "Heteropoly & Isopoly Oxometalates" by Springer Verlag (1983).
J. F. Keggin, Nature, (1933), 131, p. 908.
M. Pope & A Müller, Angew. Chem. (International English Ed.) 30 (1991) 34–48.

*Primary Examiner*—John C. Bleutge
*Assistant Examiner*—Margaret W. Glass
*Attorney, Agent, or Firm*—Robert Spector

[57] ABSTRACT

This invention provides organosiloxane compounds containing silicon-bonded polyoxometalate (POM) structures that are present as pendant groups. The invention also provides methods for preparing these reaction products.

11 Claims, No Drawings

ORGANOSILOXANE COMPOUNDS CONTAINING POLYOXOMETALATE GROUPS

BACKGROUND OF THE INVENTION

1. Field of the Invention

This invention relates to organosiloxane compounds containing ionically charged inorganic metal oxide complexes referred to as polyoxometalates. More particularly, this invention relates to organosiloxane compounds containing covalent bonds to the oxygen atoms of polyoxometalate (POM) structures.

2. Background Information

The chemical literature describes a class of ionically charged water-soluble oxides derived from polyvalent metals such as molybdenum, tungsten, and vanadium. Oxides of this type containing only the polyvalent metal and oxygen are referred to in the literature as "isopoly anions" or "isopoly complexes" and can be represented by the formula $(M'_m O_y)^p$. Anionic heteropoly complexes contain an additional metallic or non-metallic element such as hydrogen, phosphorus and silicon, and have been represented by the formula $(X_x M_m O_y)^q$.

In the foregoing formulae M' is a polyvalent metal, M is molybdenum, tungsten, vanadium niobium or tantalum, X represents the "hetero" atom, i.e. the additional non-metallic or metallic element, m, x and y are integers and p and q represent the charge on the complex, which can be calculated by adding the products obtained by multiplying the valences of X, M, and O by the value of the integer m, x or y associated with that atom. The values of p and q are negative except when M' is aluminum or gallium. The published literature reports that X can be any of at least 65 metallic or non-metallic elements.

A thorough discussion of polyoxometalates is contained in a text by M. T. Pope entitled "Heteropoly and Isopoly Oxometalates" published in 1983 by Springer Verlag. When the values of p and q in the foregoing formula are negative the oxometalate anions are associated with cations that are typically hydrogen, alkali metals, alkaline earth metals, $NH_4^+$ or $R_4N^+$, where R represents a monovalent hydrocarbon radical. The type of anion will affect the chemical and physical properties of the polyoxometalate, including solubility, and the properties of reaction products of the POM.

While there are a very large number of known polyoxometalates, investigators have found that most of these can be characterized by relatively few structures. These structures consist of groups of $MO_6$ octahedra and $XO_4$ tetrahedra that share edges, corners, and, occasionally, faces with adjacent polyhedra.

The structure of a particular polyoxometalate, the heteropolyacid $H_3PW_{12}O_{40} \cdot 6H_2O$, was described by J. F. Keggin, Nature, 1933, 131, p. 908 as a cluster of edge-shared polyhedra, and his name has been given to the polyhedron type of POM structure.

The structures of a number of POM's is discussed in the aforementioned text by Pope, in a text by M. Pope and A. Muller in Angew. Chem., (International English Edition), 30 (1991) 34–48, by G. Tsigdinos in an article entitled "Heteropoly Compounds of Molybdenum and Tungsten" that is part of a collection entitled Topics In Current Chemistry, 1978, 76, P. 1, and by V. Day and W. Klemperer in Science, 1985, 228, P. 553.

Of particular interest are POM's containing vanadium, molybdenum, tungsten, niobium and tantalum in combination with hydrogen, phosphorus or silicon as the heteroatom.

It has been reported that the chemical and physical properties of POM's can be varied over a wide range by choice of the appropriate polyvalent metal and heteroatoms.

Keggin structure anions of the formula $(XM_{12}O_{40})^{n-}$ where M is molybdenum or tungsten, X is $Si^{4+}$, $P^{5+}$, $B^{3+}$, $Ge^{4+}$, $Co^{2+}$ or $Co^{3+}$ have been defined in the literature. When X is silicon and M is tungsten or molybdenum, n is 4.

Under mildly basic conditions, one or more of the MO groups from a POM anion can be removed to form a deficient or "lacunary" structure. The structure resulting from removal of one MO group can be represented by the formula $XM_{11}O_{39}^{p-}$. The vacancy left by the departing group can be filled with other atoms or groups.

Another common structure of polyoxometalates is referred to as a Dawson structure and is represented by the formula $X_2M_{18}O_{62}^{p-}$. The heteroatom represented by X in this structure is phosphorus or arsenic, and the structure conceptually resembles a dimer of a deficient or "lacunary" Keggin structure in which three of the twelve M atoms have been removed. When the oxygen atoms are omitted the transformation to a Dawson type structure can be represented as $$XM_{12} - 3M \rightarrow XM_9 \times 2 = X_2M_{18}.$$

Reactions of the lacunary POM $W_{11}SiO_{39}^{8-}$ with monohydrocarbyltrichlorosilanes, $RSiCl_3$, have been reported by W. Knoth [J. Am. Chem. Soc., 101: 3, 759–760 (1979)]. When the reaction is carried out in an unbuffered aqueous solution, the $WO^{4+}$ unit required for a complete or "non-lacunary" structure is replaced with an $(RSi)_2O^{4+}$ group in which each of the two silicon atoms is bonded to two oxygen atoms of the POM and the product corresponds to the formula $(RSi)_2W_{11}SiO_{40}^{4+}$.

The reaction of monohydrocarbylsilanes $RSiX_3$ with the potassium and ammonium derivatives of the same lacunary POM used by Knoth is described by P. Judeinstein et al. [J. Chem. Soc., Dalton Trans. (1991) 1991–1997]. In the formula for the silane R is ethyl, vinyl, decyl or phenyl and X is chlorine or alkoxy. In one of the examples, $K_4SiW_{11}O_{39}$ and vinyltriethoxysilane are reacted in an aqueous solution and the product isolated as the tetrabutylammonium salt of the formula $[Bu_4N]_4SiW_{11}O_{39}O(SiCH=CH_2)_2$.

The incorporation of POM structures into organic polymers by reacting the vinyltrichlorosilane/POM reaction product described in the immediately preceding paragraph or the corresponding allyl- or 3-methacryloxypropyl trichlorosilane/POM reaction product with styrene or methyl methacrylate using a free radical polymerization is described by P. Judeinstein in Chemistry of Materials, 4, 4–7 (1992).

The reaction of the trivacant lacunary anion $SiW_9O_{34}^{10-}$ with $R'SiCl_3$ where R' is hydrogen, ethyl, n-butyl, vinyl, phenyl or p-tolyl is reported by N. Ammari [New. J. Chem, 15, 607–608 (1991)].

The present inventors are not aware of any attempts by others to incorporate POM structures into organosiloxane oligomers and polymers. The difference in physical, electrical, and other properties between cured polyorganosiloxanes and POM's should provide unique property combinations if it were possible to incorporate POM structures into polyorganosiloxane molecules.

One objective of this invention is to incorporate polyoxometalate (POM) structures into organosiloxane polymers and oligomers by means of covalent bonding.

SUMMARY OF THE INVENTION

The objectives of the present invention can be achieved by reacting polyorganosiloxanes containing silicon-bonded reactive groups with 1) POM's having lacunary structures, or 2) reaction products of POM's with silanes containing an alkenyl radical or silicon bonded hydrogen atom and at least two hydrolyzable groups. The POM structures are present as pendant groups in the final polyorganosiloxane molecules.

DETAILED DESCRIPTION OF THE INVENTION

One embodiment of this invention provides organosiloxane compounds in the form of oligomers and polymers comprising terminal units of a formula selected from the group consisting of $Y_aR^1{}_{3-a}SiO_{0.5}$ and

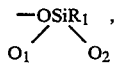

a first repeating unit of the general formula —[Si(R$^1$)$_2$O]— and a second repeating unit of a formula selected from the group consisting of

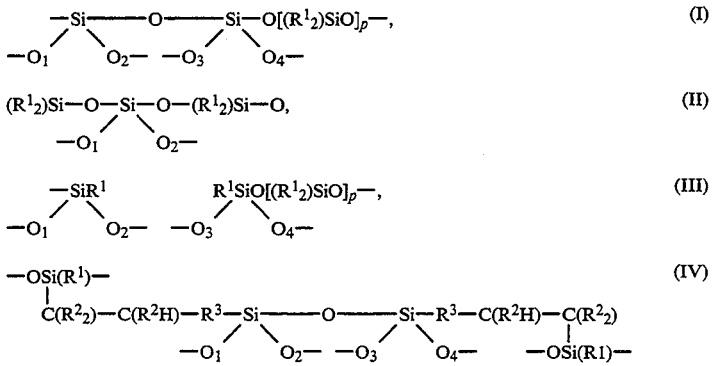

and

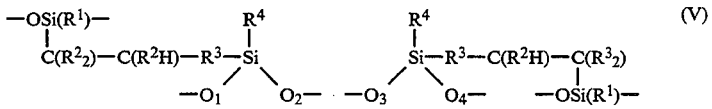

where $O_1$, $O_2$, $O_3$ and $O_4$ are part of one polyoxometalate anion exhibiting a valence of x— and a general formula selected from the group cons i sting of $XM_{11}O_{39}{}^{x-}$, $X'M_9O_{34}{}^{x-}$ and $X''_2W_{17}O_{61}{}^{x-}$, M is tungsten or molybdenum, W is tungsten, X is selected from the group consisting of $Si^{+4}$, $B^{+3}$, $Ge^{+4}$, $P^{+5}$, $Fe^{+3}$ and $As^{+5}$, X' is selected from the group consisting of $Si^{+4}$, $P^{+5}$ and $Ge^{+4}$, X" is selected from the group consisting of $P^{+5}$ and $As^{+5}$ any cation associated with said polyoxometalate anion is selected from the group consisting of hydrogen alkali metals and $R^5{}_4N^+$, where each $R^5$ represents a monovalent hydrocarbon radical, each $R^1$ and $R^4$ are individually selected from the group consisting of unsubstituted and substituted monovalent hydrocarbon radicals, each $R^2$ is individually selected from the group consisting of hydrogen and monovalent hydrocarbon radicals, $R^3$ represents a single bond or an alkylene radical, Y represents a halogen atom or a hydrolyzable group, a is 2 or 3 and p is at least 2.

The hydrolyzable groups represented by Y include any that will not interfere with reaction of the polyorganosiloxane with the polyoxometalate. Suitable groups include but are not limited to alkoxy, ketoximo, carboxyl and aminoxy. The halogen atom represented by Y is preferably chlorine.

The POM structures that characterize the present reaction products are anionic and carry a negative charge represented by x— in the preceding formulae. These anions are associated with an cation that is typically hydrogen, an alkali metal, alkaline earth metal or $R^5{}_4N^+$, where each $R^5$ represents a monovalent hydrocarbon radical that may or may not be identical to the other three $R^5$ radicals. The $R^5$ radicals are preferably identical and are preferably alkyl containing from 1 to 10 or more carbon atoms.

The type of cation will determine the physical and chemical properties of the present reaction products.

This invention also provides methods for preparing organosiloxane compounds containing covalently bonded anionic polyoxometalate groups. Organosiloxane compounds containing repeating units corresponding to formula I, II and III can be prepared by reacting 1) at least one polyorganosiloxane wherein each of the terminal silicon atoms contains two or three hydrolyzable groups with 2) a lacunary form of a polyoxometalate anion using a molar ratio of polyoxometalate to polyorganosiloxane of at least 1:1. This ratio is preferably from 2:1 up to about 5:1.

Organosiloxane compounds containing repeating units represented by formulae IV and V can be prepared by a hydrosilation reaction using an organosiloxane oligomer or polymer containing at least one silicon-bonded hydrogen atom with the reaction product of 1) a lacunary form of a polyoxometalate and 2) a silane of the general formula $CR^2{}_2=C(R^2)R^3SiR^4{}_nZ_{3-n}$, where n is 0 or 1, each $R^2$ is individually selected from the hydrogen atom and unsubstituted and substituted monovalent hydrocarbon radicals, $R^3$ represents a single bond or an alkylene radical, $R^4$ represents a monovalent hydrocarbon radical selected from the same group as $R^1$ but excluding alkenyl radicals, and Z represents a hydrolyzable group. Alternatively, the silicon-bonded hydrogen atom can be present on the POM/silane reaction product and the ethylenically unsaturated hydrocarbon radical represented by $-R^3C(R^2)C=C(R^2{}_2)$ can be present on the organosiloxane polymer or oligomer.

The POM/organosiloxane reaction products are prepared using hydrosilation reaction and characterized by the presence of the POM-containing units as pendant groups that are bonded through an alkylene radical to a silicon atom of the organosiloxane molecule used as the reactant. Because two silane molecules are bonded by one POM structure and each silane contains an alkenyl radical, the POM-containing units typically link two polyorganosiloxane molecules together.

The Polyoxometalate Reactant

The anionic portion of polyoxometalates (POM's) used to prepare the polymers of this invention exhibit deficient or "lacunary" structures that can be represented by one of the Keggin structures (1) $XM_{11}O_{39}{}^{y-}$ and (2) $X'M_9O_{34}{}^{y-}$, or by the monolacunary Dawson structure (3) $X''_2W_{17}O_{61}{}^{y-}$. In these structures M is tungsten or molybdenum, W is tungsten, X is selected from the group consisting of $Si^{+4}$, $B^{+3}$, $Ge^{+4}$, $P^{+5}$, $Ga^{+3}$, $Fe^{+3}$ and $As^{+5}$, X' is selected from the group consisting $Si^{+4}$, $P^{+5}$ and $Ge^{+4}$, X" is selected from the group consisting of $P^{+5}$ and $As^{+5}$, and $y-$ represents the value of the anionic charge on the anion.

In the Keggin structures, M is tungsten or molybdenum. When X represents silicon, the numerical value of $x-$ in structure 1 is equal to the sum of the valences of silicon (+4), 11 times the valence of M (11×6) and 39 times the valence of oxygen [39×(−2)], which calculates to −8. When the lacunary POM structure is reacted with an oligomeric or polymeric organosiloxane, four oxygen atoms of the lacunary structure react with two silicon atoms, and the valence of the POM anion decreases to −4.

When the element represented by X is silicon, pentavalent phosphorus or tetravalent germanium, which represent preferred embodiments, the polyoxometalate can exist in the "trilacunary" form represented by formula 2.

The POM's are present in combination with associated cations that are typically alkali or alkaline earth metals or ammonium groups of the formula $R_5N^+$ or $H_4N^+$, where $R^5$ represents a monovalent hydrocarbon radical. $R^5$ is preferably alkyl containing from 1 to 20 or more carbon atoms, and is most preferably butyl, hexyl, heptyl or dodecyl.

Methods for preparing the POM's used as reactants for preparing the organosiloxane compounds of this invention are reported in the chemical literature. Specific references include G. Herve et al., Inorganic Chemistry, 1977, 16, 2115 for synthesis of $SiW_9O_{34}{}^{10-}$ and the corresponding germanium compound as the sodium salts and A. Teze et al., Journal of Inorganic and Nuclear Chemistry, 1977, 39, 999 for the synthesis of the potassium salt of $SiW_{11}O_{39}{}^{8-}$. A number of methods for preparing POM's are described in volume 27 of a text entitled "Inorganic Syntheses", beginning on page 71 (John Wiley and Sons, New York).

Detailed procedures for preparing specific POM's are described by King, Hazen and Hill in Inorganic Chemistry, 1992, 31, 5316.

Non-lacunary or complete Keggin structures of POM's with anions corresponding to the formula $YM_{12}O_{40}$ can be prepared by adding an acid to an aqueous solution of sodium tungstate or sodium molybdate in the presence of a solubilized compound, such as an alkali metal silicate, containing the heteroatom represented by Y in the general formula for the POM.

In accordance with one embodiment of the present method, a organosiloxane polymer or oligomer containing two or three hydrolyzable groups at each terminal position is reacted with at least one POM having a lacunary structure. The lacunary structures can be generated during preparation of the POM by using the appropriate ratio of molybdate or tungstate salt to heteroatom compound corresponding to the formula of the desired structure and maintaining the pH of the reaction mixture at no higher than 4.8. Alternatively, a complete POM structure can be converted to a lacunary structure by hydrolysis under basic conditions.

POM's containing hydrogen, sodium or potassium as the cation are at least moderately soluble in water. The order of solubilities are H>Na>K. If the cation is tetraalkylammonium and the alkyl radicals contain from 1 to about 4 atoms the compounds are insoluble in water but soluble in polar organic solvents. When the alkyl radicals bonded to nitrogen contain more that about 4 carbon atoms the compounds are also soluble in non-polar organic solvents such as liquid hydrocarbons.

POM's suitable for reaction with silanes or organosiloxane compounds in accordance with the present method can be prepared from aqueous solutions of the corresponding alkali metal POM salt by adding an excess of a water-soluble tetraalkylammonium compound, which causes the corresponding ammonium salt of the POM to precipitate. Conversion of an alkali metal POM salt to a tetraalkylammonium salt that is soluble in non-polar organic solvents can be achieved using a phase transfer reaction with a tetraalkylammonium halide dissolved in the organic solvent. In this instance the nitrogen-bonded alkyl radicals should contain more than about 4 carbon atoms. The preparation of POM's using phase transfer reactions is described by Katsoulis and Pope (J. American Chem. Soc., 1984, 106, 2737); and Corigliano and DiPasquale (Inorganica Chimica Acta, 1975, 12, 99).

Specific reactants and conditions for preparing POM anions with a variety of associated cations are described in sufficient detail in the literature that a complete discussion of the subject is not required in this specification. The preparation of preferred POM's is described in the accompanying examples.

The Organosiloxane Reactant

The organosiloxane reactant used to prepare copolymers containing repeating units corresponding to the foregoing formulae I, II, and III is an organosiloxane polymer or oligomer with terminal units of the formula $Y_aR^1{}_{3-a}SiO_{0.5}$ and repeating units of the formula $Si(R^1)_2O$ and, optionally, $Y_2SiO$. In these formula the $R^1$ substituents represent unsubstituted or substituted monovalent hydrocarbon radicals, Y is a hydrolyzable group and a is 2 or 3. When more than one hydrocarbon radical represented by $R^1$ is bonded to a silicon atom, these hydrocarbon radicals can be identical or different. This reactant is also referred to in this specification as a "polyorganosiloxane".

Repeating units containing two hydrolyzable groups represented by Y can be formed during preparation of the polyorganosiloxane by hydrolysis of one of the Y groups on a terminal unit and subsequent condensation with the terminal unit of another polyorganosiloxane molecule to form a siloxane bond.

Suitable hydrolyzable groups that can be represented by Y include but are not limited to halogen, particularly chlorine and bromine, alkoxy, carboxy, amidoxy, and ketoximo. Halogen atoms and alkoxy groups containing from 1 to 4 carbon atoms are preferred based on cost and the nature of the by-products generated during reaction with the POM.

The polyorganosiloxane can contain as few as two up to one hundred or more siloxane units, and can have a linear or branched structure. Branched structures contain at least one trifunctional siloxane unit of the formula $R^1SiO_{3/2}$ and/or tetrafunctional unit of the formula $SiO_{4/2}$ in additional to the difunctional units. The polyorganosiloxane preferably contains from 10 to about 100 repeating units.

Examples of suitable hydrocarbon radicals that can be represented by $R^1$ include but are not limited to alkyl such as methyl, ethyl and n-propyl, substituted alkyl such as chloromethyl and perfluoroalkylethyl such as 3,3,3-trifluoropropyl, alkenyl such as vinyl and allyl, cycloalkyl such as cyclohexyl, aryl such as phenyl, alkaryl such as tolyl and xylyl and aralkyl such as benzyl. $R^1$ is preferably alkyl containing from 1 to 4 carbon atoms, 3,3,3-trifluoropropyl or phenyl. Most preferably at least one of the $R^1$ substituents on each silicon atom is methyl.

Methods for preparing organosiloxane polymers and oligomers containing three hydrolyzable groups at the terminal positions are described in the prior art.

A preferred method for preparing trichlorosilyl-terminated organosiloxane oligomers and polymers is described in U.S. Pat. No. 3,161,614, issued to P. Brown and J. Hyde. This method comprises reacting a silanol terminated organosiloxane containing from 2 to about 100 siloxane units with a stoichiometric excess of silicon tetrachloride in the presence of a suitable acid acceptor such as an amine. The reaction is typically exothermic, and the reactants may require cooling to avoid an uncontrolled, potentially hazardous reaction.

The average structural formula for preferred trichlorosilyl-terminated polyorganosiloxanes can be written as

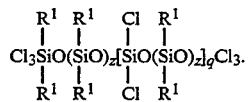

In this formula $R^1$ is a monovalent hydrocarbon radical as defined in a preceding section of this specification and z represents the degree polymerization of the silanol-terminated organosiloxane compound used to prepare the chlorinated polyorganosiloxane. Data from $^{29}Si$ nuclear magnetic resonance collected by the present inventor indicate the average value of q to typically be between 0 and 1.

Trialkoxysilyl-terminated polyorganosiloxanes can be prepared by reacting a silanol-terminated organosiloxane with an alkyl orthosilicate. No acid acceptor is needed, however a catalyst such as sodium acetate can be added to the reaction mixture. Reaction temperatures of from 50° to about 200° C. may be required to obtain a useful yield of product in a reasonable time period.

The average formula for preferred trialkoxysilyl-terminated polyorganosiloxanes is similar to that of the trichlorosilyl species described in a preceding section of this specification, with the exception that the chlorine atoms are replaced by alkoxy groups.

Reaction of the POM with the Polyorganosiloxane

Organosiloxane compounds containing repeating units corresponding the formulae I, II and II in the preceding sections of this specification are prepared by reacting a polyorganosiloxane, which includes organosiloxane oligomers, containing two or three hydrolyzable groups at each terminal position with a lacunary POM. The cation associated with the POM is typically hydrogen, an alkali metal or tetraalkylammonium. For convenience organosiloxane polymers and oligomers will both be referred to hereinafter as polyorganosiloxanes.

The reaction between the POM and the polyorganosiloxane can be conducted by dissolving both reactants in a suitable solvent or a mixture of solvents under ambient conditions. The mixture can be heated up to the reflux temperature of the solvent to accelerate solubilization of the reactants. Because polyorganosiloxanes are typically not soluble in solvents containing water, the POM is preferably in the form of an ammonium salt or other salt that is at least partially soluble in the reaction medium.

Alternatively, the polyorganosiloxane is dissolved in a suitable organic solvent, following which an alkali metal salt of the POM is added as a solid and the resultant slurry is stirred for a sufficient time to react the slightly POM with the polyorganosiloxane to form a product that is soluble in the reaction medium. The reaction mixture is then filtered to remove undissolved solids that are typically unreacted POM and an inorganic salt of the alkali metal that was initially associated with the POM.

If it is desired to precipitate the POM/polyorganosiloxane reaction product from a non-polar solvent or a mixture of polar and non-polar organic solvents, such as a mixture of toluene and acetonitrile, a lower alkyl ammonium salt such as tetra-n-butyl ammonium chloride is added to the reaction mixture.

Depending upon the nature of the POM cation, the organic liquid used for the reaction medium can be polar, non-polar or a mixture of polar and non-polar liquids, and the concentration of POM is from 1 to 50 weight percent, based on the total weight of the reaction mixture.

Organosiloxane compounds containing repeating units corresponding to the formulae

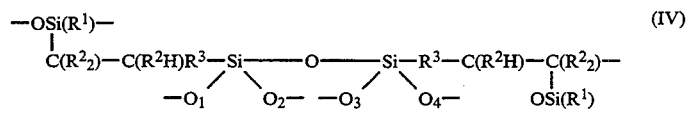

and

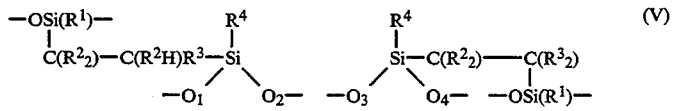

are prepared by first reacting the lacunary POM with at least two moles per mole of POM of a silane containing 1) an alkenyl radical or a silicon-bonded hydrogen atom and 2) two or three silicon-bonded hydrolyzable groups. Any remaining valences on the silicon atom are satisfied by monovalent hydrocarbon radicals represented by $R^4$.

Reaction products of POM's and vinyltrichlorosilane and a method for preparing these reaction products are described by P. Judeinstein et al. in J. Chem. Soc. Dalton Trans. 1991, pp. 1991–1997. Alternatively, the locations of the alkenyl radical and silicon-bonded hydrogen atom can be reversed.

Reactions between silicon-bonded hydrogen atoms and alkenyl radicals are referred to as hydrosilation reactions, and are catalyzed by metals from the platinum group of the periodic table and compounds of these metals.

Depending upon whether the hydrocarbon radical represented by $R^4$ is present or absent in the silane that is reacted with the polyoxometalate (POM) the reaction product of the POM and a silane containing a silicon-bonded alkenyl radical can be represented by the formula

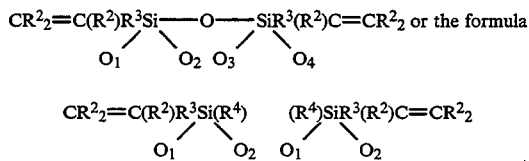

where each $R^2$ individually represents a hydrogen atom or a monovalent hydrocarbon radical, $R^3$ represents a single bond or an alkylene radical, $R^4$ represents a monovalent hydrocarbon radical as defined in detail in a subsequent portion of this specification for $R^1$, with the proviso that $R^4$ does not contain ethylenic unsaturation.

The pendant oxygen atoms $O_1$, $O_2$, $O_3$ and $O_4$ are part of one POM structure.

Preferably all of the substituents represented by $R^2$ are hydrogen, $R^3$ is a single bond and $R^4$ is methyl.

Preferred reactants and conditions for preparing this type of polyorganosiloxane/POM reaction products are described in the accompanying examples.

The polyorganosiloxanes that are reacted with POM/silane reaction products to prepare copolymers containing repeating units represented by formulae IV and V contain at least one silicon-bonded alkenyl radical such as vinyl or 5-hexenyl or at least one silicon-bonded hydrogen atom per molecule. The alkenyl radical(s) and silicon-bonded hydrogen atoms can be located at terminal or non-terminal positions. The remaining non-terminal siloxane units are of the same types discussed in the preceding paragraphs of this specification for the polyorganosiloxanes containing hydrolyzable groups at the terminal positions. The terminal units contain either three monovalent hydrocarbon radicals of the type represented by $R^1$, with the exception of alkenyl, or two of these hydrocarbon radicals and a silicon-bonded alkenyl radical or silicon-bonded hydrogen atom.

Reaction products of POM's with silanes containing vinyl radicals are described in the literature, including a communication from P. Judeinstein [Chem. Mat., 1992, 4, pp. 4–7]. In accordance with this method an alkenyl-substituted silane such as vinyltrichlorosilane is reacted with a lacunary POM such as $K_4SiW_{11}O_{39}$. The proposed structure of the silyl-substituted POM is

where the two free valences of each silicon atom are bonded to oxygen atoms of a single POM structure.

The reaction of polyorganosiloxanes containing silicon-bonded hydrogen atoms or alkenyl radicals with silyl-substituted POM's containing alkenyl radicals or silicon-bonded hydrogen atoms is conducted in the presence of a platinum group metal-containing hydrosilation catalyst. It should be apparent that either the silane that is reacted with the POM or the polyorganosiloxane contains can the alkenyl radicals and the other reactant contains the silicon-bonded hydrogen atoms.

Properties of POM/Polyorganosiloxane Reaction Products

The physical properties of the POM/polyorganosiloxane reaction products of this invention depend upon a number of variables, including the molecular weight of the polyorganosiloxane and the cation portion of the POM. The cation will also determine the solvents that can be used as the reaction medium.

The physical form of the present reaction products range from powdery solids to waxy materials to gels. Products derived from polydiorganosiloxanes containing more than about 30 repeating units are elastomers in which the POM groups appear to function as a reinforcing filler.

The solid, non-elastomeric reaction products have the potential for use as reinforcing fillers in organosiloxane and other types of elastomers.

Some of the non-elastomeric reaction products are photo reducible, absorb ultraviolet (UV) radiation and undergo color changes in the presence of X-rays. The electrical and chemical properties of the present materials indicate their potential for use in applications requiring electrochromic, photochromic and/or electroconductive materials.

Some of the elastomeric materials exhibit high dielectric constants and low dissipation factors. The ability of certain of these properties, such as dielectric constant, of these materials to change with repeated testing is indicative of their potential for use in electronic memory devices. In addition, the elastomers appear to have photochromic and electrochromic properties similar to those of the non-elastomeric materials.

EXAMPLES

The following examples describe preferred embodiments of the present POM/polyorganosiloxane reaction products, the properties of these materials and methods for preparing them. The examples should not be interpreted as limiting the scope of the invention defined in the accompanying claims. Unless otherwise specified all parts and percentages in the examples are by weight and viscosities are the values measured at 25° C.

Preparation of the Polyorganosiloxane Reactants

The following procedures were used to prepare the polyorganosiloxane reactants.

Polyorganosiloxane Reactant 1 was prepared by charging a glass reactor with 35 g (0.044 mmol) of a silanol-terminated polydiorganosiloxane having an average degree of polymerization of 8.5, 92 g (0.442 mole) of ethyl orthosilicate and 0.13 g of potassium acetate. The reactor was equipped with a stirring bar, a water cooled condenser and a Dean-Stark trap. This mixture was maintained at a temperature of 130°-131° C. for three minutes, during which time 2.14 g of volatile materials were removed. The temperature of the mixture was then increased to 151° C., during which time a total of 0.6 g of volatile materials were collected.

The mixture was then concentrated by heating under reduced pressure while the temperature of the liquid was allowed to increase to 147° C. The final pressure was 24 mm Hg and a total of 74.49 g of volatile material was recovered. The residue was filtered to yield 45.46 g (equivalent to 93.18 percent yield based on siloxane reactant) of a water white liquid. Analysis using $^{29}$Si NMR indicated a degree of polymerization of 12.64.

Polyorganosiloxane Reactant 2 was prepared by charging a glass reactor equipped as described for polyorganosiloxane reactant 1 with 200 g (0.05 mmol) of a silanol-terminated polydiorganosiloxane with an average degree of polymerization of 48.5, 212.7 g (1.02 mole) of ethyl orthosilicate and 0.41 g of potassium acetate. This mixture was heated to 140° C. over a 40 minute period, at which time the temperature of the reaction mixture was increased to 160 over 4.1 hours. 6.93 g of volatile materials were removed during this period. Heating was then terminated and the mixture allowed to remain under ambient conditions for about 16 hours with stirring. The mixture was then concentrated by heating it at 156° C. and 14 mm Hg until the temperature of the vapor phase decreased to 27° C. 137.4 g of volatile materials were recovered during this period. The residual liquid was filtered to yield 230.25 g of a water white liquid containing a triethoxysilyl-terminated polydimethylsiloxane having an average degree of polymerization of 52.45.

Polyorganosiloxane Reactant 3, a trichlorosilyl-terminated organosiloxane oligomer with an average degree of polymerization of 9.29, was prepared by charging a glass reactor equipped with a nitrogen inlet with 540 g silicon tetrachloride (tetrachlorosilane) and 130 cc of dry toluene. A nitrogen atmosphere was maintained during charging of the reactor and throughout the reaction. A mixture of 251.8 g of a silanol-terminated polydimethylsiloxane with an average degree of polymerization of 8.49, 99.67 g of pyridine and 255 cc toluene was placed in an addition funnel and was added to the reactor over a 31 minute period, during which time the temperature of the mixture increased from 21° to 59° C. The mixture was stirred for 4 hours following completion of the addition. The mixture was then filtered to remove the solid that had formed, and the filtrate was concentrated by heating for 0.5 hour at 95° C. and 5 mm Hg. 182.8 g of a pale yellow liquid were obtained.

Polyorganosiloxane Reactant 4, a trichlorosilyl-terminated polydimethylsiloxane exhibiting an average degree of polymerization of 56.4 was prepared using the general procedure described for organosiloxane reactant 4. The reactor was charged with 101.6 g (0.6 mole) of silicon tetrachloride and 315.3 g of toluene, and the addition funnel was charged with 200 g (0.051 mole) of a silanol-terminated polydimethylsiloxane exhibiting an average degree of polymerization of 50.45, 42.5 g (0.54 mole) of pyridine, and 300 g of toluene. The contents of the addition funnel were added to the reactor over a 10 minute period. While the temperature of the mixture was controlled using an ice bath, the temperature increased from 14° to 22° C. during the first four minutes and remained within the range of from 22° to 25° C. during the remainder of the addition. An additional 130 g of toluene was then added through the addition funnel, following which stirring was continued for two hours.

The solid that had precipitated during the reaction was removed by centrifugation and extracted once with toluene before being discarded. The toluene was combined with the liquid portion of the reaction mixture and filtered. The hazy filtrate was concentrated by heating for 0.5 hour at 100° C. and 5 mm Hg. The resultant liquid weighed 151.53 g, equivalent to a yield of 70.9 percent, based on initial polyorganosiloxane. The average degree of polymerization of the product was 56.4, excluding cyclic materials.

Polyoxometalate 1—$K_8SiW_{11}O_{39}\cdot 12H_2O$

Into a glass reactor equipped with a stirrer, thermometer, water cooled condenser and addition funnel were placed 182 g (0.552 mole) of sodium tungstate, $Na_2WO_4\cdot 2H_2O$, 11 g (0.052 mole) of sodium metasilicate, $Na_2SiO_3\cdot 5H_2O$, and 300 cc distilled water. The mixture was heated at 93° C. until all of the solids dissolved, at which time 195 cc of 4N aqueous hydrochloric acid were added over 3 hours. Addition of the acid was halted when the mixture became hazy and was resumed when the haziness decreased. Following completion of the addition the mixture was heated at the boiling point for 10 minutes, during which time much of the haziness disappeared. The mixture was then filtered to obtain a clear, water white filtrate.

The filtrate was heated to 70°-75° C., at which time 75 g of potassium chloride were added and the mixture was stirred for 15 minutes with heating. The mixture was filtered hot and the precipitate was washed 4 times with cold water. The precipitate was then dried under a nitrogen stream. The dried solid weighed 131.95 g, equivalent to a yield of 82.4 percent. The product was identified by its infra-red and ultraviolet spectra and by the use of $^{29}$Si and $^{183}$W nuclear magnetic resonance (NMR) spectroscopy.

Preparation of POM Reaction Products with Polyorganosiloxanes (1) Synthesis of the Mixed POM/Polyorganosiloxane of Proposed Structures

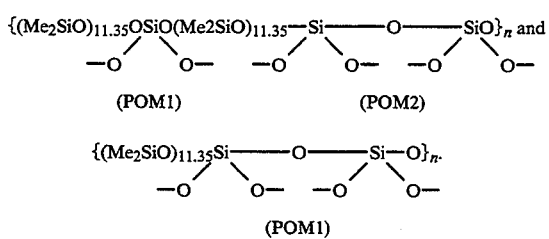

(POM1)  (POM2)  I $\{(Me_2SiO)_{11.35}Si\!\!-\!\!-\!\!-\!\!O\!\!-\!\!-\!\!-\!\!Si\!\!-\!\!O\}_n.$  II
(POM1)

The oxygen atoms adjacent to any of the "POM1" or "POM2" labels are believed to be part of that POM structure. $SiW_{11}O_{39}{}^{4-}$ 4(n—$Bu_4N$)+ where n—Bu represents the n-butyl radical.

A glass reactor equipped with a magnetic stirring bar, and an addition funnel with pressure equalizing side arm was charged with 15 g ($5\times10^{-3}$ moles) of the POM compound $K_8SiW_{11}O_{39}$ and a mixed solvent containing 404 g acetonitrile and 404 g toluene, and the resultant mixture was stirred for 2 hours under ambient conditions. To the resultant white slurry 5.31 g of a solubilized mixture of the oligomeric chlorine-substituted organosiloxanes (a) $Cl_3Si$—O—$(me_2SiO)_{11.35}$—$SiCl_2$—O—$(Me_2SiO)_{11.35}$—$SiCl_3$ and (b) $Cl_3Si$—O—$(Me_2SiO)_{11.35}$—$SiCl_3$ dissolved in 19.81 g of toluene was added over a 29 minute period. The molar ratio of a:b, estimated from the $^{29}Si$ NMR spectrum of the siloxane mixture, was 65:35. Following completion of the addition, the addition funnel was rinsed with about 6 g of toluene.

Stirring of the mixture was continued for another 72 hours, at which time the solids that had formed were separated by centrifugation. The liquid was removed by decantation and vacuum filtered through a 0.22 micron nylon membrane. 2.88 g of inorganic solids, believed to contain unreacted POM and potassium chloride, were collected.

14.18 g, ($4.4\times10^{-2}$ moles) of tetrabutyl ammonium bromide, $(C_4H_9)_4NBr$ were added to the filtrate, and the resultant mixture was stirred for 1.5 hours. The precipitate that formed during the reaction was collected, washed with a 1:1 volume ratio mixture of acetonitrile and toluene, and allowed to dry under ambient conditions. The dried material weighed 1.73 g. The liquid portion of the mixture contained the major portion of the desired product. This liquid was concentrated for 45 minutes using a rotary evaporator operating at between 55° and 57° C. and less than 5 mm Hg. The product was 29.7 g of a creamy, opaque/yellow, stiff and tacky material. Most of the solid was then redissolved in 206 g of acetonitrile. The hazy translucent solution was centrifuged, the yellowish liquid phase decanted and vacuum filtered through a 0.22 micron nylon membrane.

The product was precipitated from the acetonitrile solution by the addition of 614 g of deionized water to the liquid phase and separated by centrifugation followed by decantation of the solvent. The solid material was dried under a stream of dry $N_2$. 16.98 g of finely divided white powder was obtained. This final product was characterized using IR, UV/VIS, its $^{29}Si$ and $^{183}W$ NMR spectra, and low angle laser light scattering. The data unequivocally proved that the product contained POM structures covalently bonded to the organosiloxane oligomer through Si—O—W bonding.

(2) Synthesis of the POM/Siloxane Reaction Products of Proposed Structures

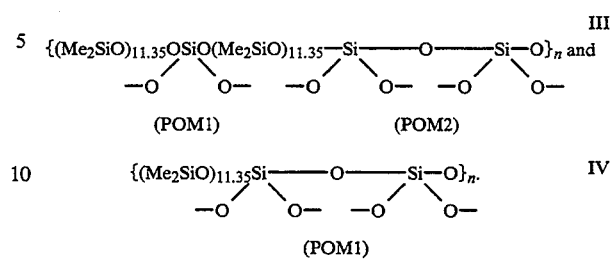

(POM1)  (POM2)  III $\{(Me_2SiO)_{11.35}Si\!\!-\!\!-\!\!-\!\!O\!\!-\!\!-\!\!-\!\!Si\!\!-\!\!O\}_n.$  IV
(POM1)

The oxygen atoms adjacent to each of the "POM1" and "POM2" labels are believed to be part of that POM structure $SiW_{11}O_{39}{}^{4-}$ $xK^+$ 4—$xH^+$.

200 g each of acetonitrile and toluene that had been dried over 3 Å molecular sieves were placed in a glass reactor equipped with a magnetic stirrer. 13.15 g ($4.4\times10^{-3}$ moles) of $K_8SiW_{11}O_{39}$ that had been dried at a temperature of 115° to 117° C. for about 16 hours was added to the solvent mixture and the mixture was stirred for 5 hours. To the white slurry was added, over a 10 minute period, 4.67 g of a solubilized mixture of the oligomeric trichlorosiloxy-terminated organosiloxanes (3) $Cl_3Si$—O—$(Me_2SiO)_{11.35}$—$SiCl_2$—O—$(Me_2SiO)_{11.35}$—$SiCl_3$ and (4) $Cl_3Si$—O—$(Me_2SiO)_{11.35}$—$SiCl_3$ and 12.69 g of toluene as the solvent.

The molar ratio of polyorganosiloxane 3 to polyorganosiloxane 4, determined using $^{29}Si$ NMR data, was 65:35. The funnel used for the addition was rinsed with 4.57 g of toluene, and the mixture was allowed to stir for 24 hours. The solid portion of the mixture (I) was separated by centrifugation and discarded. The liquid phase was removed by decantation, filtered and the solid material was dried. The dried solid weighed 2.5 g and consisted essentially of unreacted POM and potassium chloride.

The liquid phase was concentrated by heating for about one hour at from 40° to 45° C. and less than 5 mm Hg pressure. At this time 15.74 g of an opaque yellowish solid were recovered. The material was soluble in water but hydrolytically unstable. It is believed that the protons, a by-product of the hydrolysis of the chlorine atoms of the initial organosiloxane oligomers, promotes dissociation of the Si—O—W bonds and the formation of condensed siloxane gels and $SiW_{12}O_4O^{4-}$. When the product was dissolved in water the initially clear solution became hazy upon standing and eventually separated into an aqueous phase and a gel phase.

(3) Synthesis of the POM/Polyorganosiloxane Reaction Product of Proposed Structure

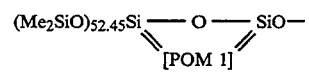

The four oxygen atoms adjacent to the POM1 label are believed to be part of the POM structure $K^+{}_xH^+{}_{4-x}\, SiW_{11}O_{39}{}^{4-}$.

A glass reactor equipped with a magnetic stirrer was charged with 267.97 g of acetonitrile and 363 g of toluene. 20 g ($6.7\times10^{-3}$ moles) of the POM $K_8SiW_{11}O_{39}$ that had been dried for about 16 hours at 115°–117° C. were then added, and the mixture was stirred for 2.5 hours. At this time a solution prepared by dissolving 19.5 g ($4.5\times10^{-3}$ moles) of $Cl_3SiO$—$(Me_2SiO)_{52}$-

45—SiCl₃ in 19.4 g of toluene was added in portions to the mixture over about a 4 minute interval. Following addition of the siloxane the appearance of the reaction mixture changed from a milky opaque slurry to a dispersion of a gel-like material that deposited on the wall of the reactor. The liquid phase of the mixture became slightly yellow. The mixture was stirred at room temperature for another 20.5 hours, during which time the yellow color faded, and the dispersed materials appeared to diminish in volume.

The solid and liquid phase materials were separated by vacuum filtration through a 0.22 micron nylon membrane filter, the solid phase was washed with a mixture of acetonitrile and toluene, and retained. The liquid material from the reactor and the washings were combined (696.97 g), centrifuged, and the liquid phase (A) was separated by decantation. After being dried under nitrogen the retained solids weighed 9.66 g. These solids were discarded.

Liquid phase A was separated into two equal parts. One portion was used to prepare the acid form of the POM adduct as follows: 357.99 g of the liquid was placed in a 500 ml one neck flask and stripped in a rotary evaporator at 35°–40° C. After about half of the solvent had been removed, the solution turned hazy, and thickened up. The removal of the solvent was discontinued, and the product was a gel-like material with thixotropic properties.

(4a) The second portion of liquid phase (A) was used to prepare the tetrabutylammonium salt of the POM/-polyorganosiloxane adduct,

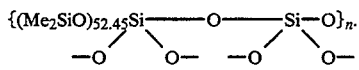

$\{(Me_2SiO)_{52.45}Si\!-\!\!O\!-\!\!Si\!-\!O\}_n$.

The four oxygen atoms are believed to be part of a single POM structure $(C_4H_9)_4N]_xH_{4-x}SiW_{11}O_{39}^{4-}$.

To 364.7 g of liquid phase (A) was added a solution containing 2.5 g ($7.75 \times 10^{-3}$ moles) of tetra-n-butylammonium bromide dissolved in 24.5 g of acetonitrile. The solid material that precipitated was isolated by decanting the upper portion of the liquid phase followed by filtration of the remaining mixture through a 0.22 micron nylon membrane filter. After drying under $N_2$ between 0.5 and 1 g of a white elastomer was obtained.

(5) This example describes preparation of another elastomeric POM/polyorganosiloxane reaction product.

A glass reactor was charged with a mixture of 20 g of acetonitrile and 27 g of toluene. To this mixture was added 1.38 g ($3.29 \times 10^{-4}$ moles) of the oligomeric organosiloxane $Cl_3SiO\!-\!(Me_2SiO)_{52.45}\!-\!SiCl_3$ and the resultant mixture was stirred until the organosiloxane had dissolved. 1.5 g ($5 \times 10^{-4}$ moles) of the POM $K_8SiW_{11}O_{39}$ that had been dried for about 16 hours at 115°–117° C. were added then added to the mixture, which was then stirred for about 16 hours. The solids that had formed during this period were separated by centrifuging and decanting the supernatant liquid and 0.048 g ($1.3 \times 10^{-4}$ moles) of tetra-n-butyl ammonium bromide, $(C_4H_9)_4NBr$ were added to the liquid phase. The solution become slightly hazy.

The suspended solids were separated by centrifugation, the clear liquid was decanted and concentrated by heating under reduced pressure until it exhibited an opaque, milky appearance. About one gram of an elastomer was formed following complete evaporation of the liquid phase. The elastomer was characterized by IR, reflectance IR to verify the presence of the POM structure and UV, to detect the presence of tungsten, using thin films of the materials and dielectric measurements. Photographs obtained using a scanning electron microscope showed areas of high electron density resulting from the tungsten atoms of the POM structures.

(6) The reaction product of the POM $(C_7H_{15})_4N]^{4+}$ $SiW_{11}O_{39}^{8-}$ and the organosiloxane oligomer $(OC_2H_5)_3SiO\!-\!(Me_2SiO)_{12.64}\!-\!Si(OC_2H_5)_3$.

A glass reactor was charged with 20 ml of a toluene solution containing $6.24 \times 10^{-4}$ moles of the $SiW_{11}O_{39}^{8-}$ POM anion and a ten fold molar excess of the $[(C_7H_{15})_4N]^+$ cation. To this mixture was added 0.9 g ($6.97 \times 10^{-4}$ moles) of $(EtO)_3SiO\!-\!(Me_2SiO)_{12.64}\!-\!Si(OEt)_3$. 0.16 ml ($1.87 \times 10^{-3}$ moles) of concentrated aqueous HCl were then added. No apparent change in the appearance of the initial mixture was observed. The mole ratio of the three ingredients $SiW_{11}O_{39}$ anion:organosiloxane:HCl was 1:1:3.

The mixture was heated for 24 hours at the boiling point, at which time it was allowed to cool to ambient temperature, and stirred for 48 hours. About 12 ml of the liquid was removed by distillation. The remaining volatile liquids were removed under reduced pressure at room temperature. A gummy white solid was obtained.

The volatile components were identified by gas liquid chromatography (GLC) as primarily ethanol, water, octamethylcyclotetrasiloxane ($D_4$), decamethylcyclopentasiloxane ($D_5$), and dodecamethylcyclohexasiloxane ($D_6$). The formation of volatile cyclic siloxane products is the result of the well known acid catalyzed equilibrium between cyclic and linear forms of polyorganosiloxanes that would be expected to occur even in the absence of the polyoxometalate.

The gummy white solid was then placed in an oven at 150° C. for 16 hours, resulting in a 47 percent weight loss, believed due to acid catalyzed formation of cyclic siloxanes, and formation of a gummy, slightly yellow, soft solid. $^{29}Si$ NMR spectroscopy revealed that the POM was covalently attached to the siloxane via Si—O—W bonds and indicated the presence of very small amounts of volatile components in the final product. The identity of the product was confirmed by its infrared (IR), ultra-violet (UV), $^1H$ NMR and $^{13}C$ NMR spectra, and by analysis using a thermogravimetric analyzer and a differential scanning calorimeter.

(7) This example describes the preparation of a POM/polyorganosiloxane product using the tetraheptylammonium salt of the POM.

The proposed structures of the two reaction products are shown in Example 1, with the exception that the POM portion of the final product is $SiW_{11}O_{39}^{4-}$ $4\{(C_7H_{15})_4N^+\}$.

A glass reactor equipped with water-cooled condenser, an addition funnel and a stirrer was charged with 20 ml of a toluene solution containing $3.1 \times 10^{-3}$ moles of the $SiW_{11}O_{39}^{8-}$ anion, and $3.1 \times 10^{-2}$ moles of the $[(C_7H_{15})_4N]^+$ cation. To this solution was added dropwise through the addition funnel a solution containing (a) 4.31 g of the oligomeric chlorine-containing organosiloxanes $Cl_3Si\!-\!O\!-\!(Me_2SiO)_{11.35}\!-\!SiCl_2\!-\!O\!-\!(Me_2SiO)_{11.35}\!-\!SiCl_3$ and $Cl_3Si\!-\!O\!-\!(Me_2SiO)_{11.35}\!-\!SiCl_3$ in a mole ratio, estimated from $^{29}Si$ NMR data, of 65:35, and (b) 10 ml toluene. The addition of the organosiloxanes required about twelve minutes, and the final mixture had a slight yellow/greenish tinge. The solution was stirred for about 16 hours, at which time the solvent was removed by evaporation. The residue was a mixture of yellow and white solids having the consistency of a gum. The yellow portion of the precipitate was dissolved in acetonitrile, leaving an insoluble white, sticky, crumbly solid. This material had the appearance of a crosslinked organosiloxane gum. The solvent portion of the yellow solution was allowed to evaporate, leaving a yellow gummy solid.

The presence of covalent Si—O—W bonds was verified by $^{29}$Si NMR spectroscopy. The material was also characterized by IR spectroscopy.

(8) Synthesis of a product containing the POM group $[(C_7H_{15})_4N]_4$ $SiW_{11}O_{39}$ and the siloxane unit

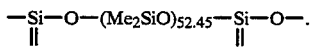

A glass reactor equipped with two addition funnels and magnetic stirring bar was charged with 13.38 g ($2.25 \times 10^{-3}$ moles) of $[(C_7H_{15})_4N]_8$ $SiW_{11}O_{39}$ and 50 ml of toluene. This mixture was stirred for about 16 hours, at which time a solution of 0.14 g of pyridine in 4.87 g of toluene was added to the POM/toluene solution. Over a ten minute period 3.16 g ($7.6 \times 10^{-4}$ moles) of $Cl_3SiO$—$(Me_2SiO)_{52.45}SiCl_3$ and 20.23 acetonitrile were added concurrently and separately through the addition funnels into the toluene/POM/pyridine solution, and the resulting colorless solution was stirred for four days. The solvent and other volatile materials were removed under reduced pressure using a water bath at ambient temperature. The resulting white, opaque residue had the consistency of taffy and was dried under a nitrogen stream. The formation of covalent Si—O—W bonding between the POM and the siloxane was confirmed using $^{29}$Si NMR spectroscopy. In this procedure pyridine is used as to react with the HCl generated as a by-product.

(9) Second synthesis of a product containing the POM group $[(C_7H_{15})_4N]_4$ $SiW_{11}O_{39}$ and the organosiloxane portion

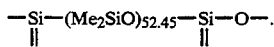

This synthesis differs from the preceding one in that there is no acid scavenger (pyridine) used.

A glass reactor equipped with a magnetic stirring bar and two addition funnels was charged with a solution containing 6.09 g ($1.02 \times 10^{-3}$ moles) $[(C_7H_{15})_4N]_8$ $SiW_{11}O_3$ and 20 g toluene, and the contents of the reactor were stirred for about 16 hours. Over about 90 minutes 1.45 g ($3.4 \times 10^{-4}$ moles) $Cl_3SiO$—$(Me_2SiO_{52.4\text{-}5}SiCl_3$ and 10 g acetonitrile were added dropwise to the reactor through separate addition funnels.

The slightly yellow solution was then stirred under ambient conditions for 40 hours. The solvent was then removed by evaporation under reduced pressure, leaving an opaque gummy-like solid. $^{29}$Si NMR spectroscopy confirms that the POM was covalently bound to the organosiloxane molecules. The material slowly converted to a crosslinked, insoluble, opaque, weak gel containing the POM groups trapped within the network. This reaction was believed due to condensation of the terminal ethoxy groups.

That which is claimed is:

1. An organosiloxane compound comprising terminal units of formula selected from the group consisting of $Y_aR^1{}_{3-a}SiO_{0.5}$ and

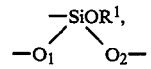

a first repeating unit of the general formula —[Si(R$^1$)$_2$O]— and a second repeating unit of a formula selected from the group consisting of

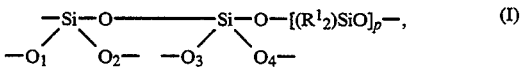    (I)

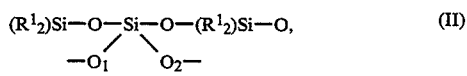    (II)

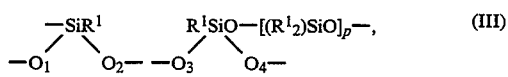    (III)

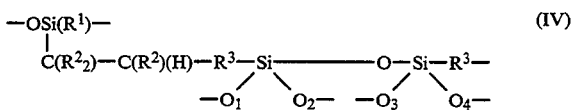    (IV)

and

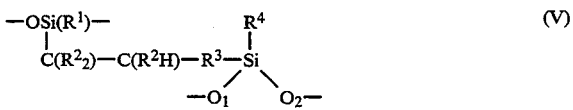    (V)

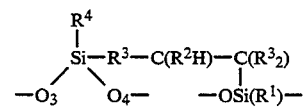

where $O_1$, $O_2$, $O_3$ and $O_4$ are part of one polyoxometalate anion exhibiting a valence of x— and a general formula selected from the group consisting of $XM_{11}O_{39}{}^{x-}$, $X'M_9O_{34}{}^{x-}$ and $X''_2W_{17}O_{61}{}^{x-}$, M is tungsten or molybdenum, W is tungsten, X is selected from the group consisting of Si$^{+4}$, B$^{+3}$, Ge$^{4+}$, P$^{+5}$, Fe$^{+3}$ and Ge$^{+4}$, X'' is selected from the group consisting of Si$^{+4}$, p$^{+5}$ and Ge$^{+4}$, X'' is selected from the group consisting of p$^{+5}$ and As$^{+5}$, the cation associated with said polyoxometalate anion is selected from the group consisting of hydrogen alkali metals and R$^5{}_4$N$^+$, where each R$^5$ represents a monovalent hydrocarbon radical, each R$^1$ and R$^4$ are individually selected from the group consisting of unsubstituted and substituted monovalent hydrocarbon radicals, each R$^2$ is individually selected from the group consisting of hydrogen and monovalent hydrocarbon radicals, R$^3$ represents a single bond or an alkylene radical, Y represents a halogen atom or a hydrolyzable group, a is 2 or 3 and p is at least 2.

2. A compound according to claim 1 where the cation is hydrogen, potassium, or R$^5{}_4$NH+ where R$^5$ represents an alkyl radical containing from 1 to 12 carbon atoms, Y is halogen or an alkoxy group containing from 1 to 4 carbon atoms, X is silicon, pentavalent phosphorus or germanium, and each R$^1$ is individually selected from the group consisting of alkyl radicals containing from 1 to 4 carbon atoms, perfluoroalkylethyl radicals and the phenyl radical.

3. A compound according to claim 2 where $R^5$ is butyl or heptyl, X is silicon, the polyoxometalate anion exhibits the formula $XM_{11}O_{39}{}^{x-}$, at least one $R^1$ bonded to each silicon atom is methyl, $R^2$ is hydrogen, $R^3$ is a single bond, $R^4$ is methyl, and p is from 1 to 100, inclusive.

4. A compound according to claim 3 wherein the repeating units of said compound exhibit a formula selected from the group consisting of

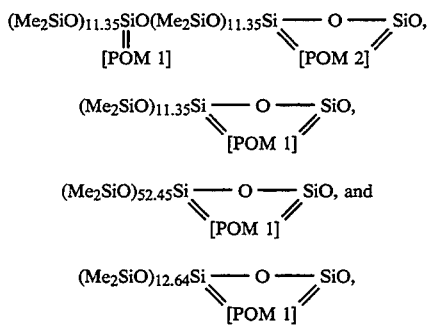

where POM 1 and POM 2 represent the polyoxometalate anion $SiW_{11}O_{39}{}^{4-}$ that is associated with a cation selected form the group consisting of hydrogen, potassium, tetrabutyl ammonium and tetra-n-heptyl ammonium.

5. A method for preparing an organosiloxane compound containing pendant polyoxometalate structures, said method comprising reacting a polyorganosiloxane wherein each of the terminal silicon atoms contains two or three hydrolyzable groups with a polyoxometalate anion exhibiting a formula selected from the group consisting of $XM_{11}O_{39}{}^{x-}$, $X'M_9O_{34}{}^{x-}$ and $X''_2W_{17}O_{61}{}^{x-}$, M is tungsten or molybdenum, X is selected from the group consisting of $Si^{+4}$, $B^{+3}$, $Ge^{+4}$, $p^{+5}$, $Fe^{+3}$ and $As^{+5}$, X' is selected from the group consisting of $Si^{+4}$, $p^{+5}$ and $Ge^{+4}$, X'' is selected from the group consisting of $p^{+5}$ and $As^{+5}$, x represents the valence of the polyoxometalate anion, said anion is associated with a cation selected from the group consisting of hydrogen, alkali metals and $R^5{}_4N^+$, where each $R^5$ represents a monovalent hydrocarbon radical.

6. A method according to claim 5 where the cation is hydrogen, potassium, or $R^5{}_4N^+$ where $R^5$ represents an alkyl radical containing from 1 to 12 carbon atoms, said hydrolyzable group is a halogen atom or an alkoxy group containing from 1 to 4 carbon atoms, X is silicon, pentavalent phosphorus or germanium, said polyorganosiloxane contain at least two siloxane units of the formula $R^1{}_2SiO$ where $R^1$ represents an unsubstituted or substituted monovalent hydrocarbon radical, the molar ratio of polyoxometalate anion to organosiloxane reactant in the reaction mixture is at least 1:1, and the reaction between said polyoxometalate anion and said polyorganosiloxane is conducted in an organic solvent as the reaction medium and at a temperature from ambient to the boiling point of the reaction medium.

7. A method according to claim 6 where $R^5$ is butyl or heptyl, X is silicon, said polyorganosiloxane contains from 10 to 100 siloxane units, at least one $R^1$ bonded to each silicon atom of said polyorganosiloxane is methyl and the remaining $R^1$ is an alkyl radical containing from 1 to 4 carbon atoms, a perfluoroalkylethyl or a phenyl radical, and said molar ratio is from 2:1 to 5:1, inclusive.

8. A method for preparing an organosiloxane compound containing pendant polyoxometalate structures, said method comprising reacting a polyorganosiloxane containing at least one silicon-bonded hydrogen atom with the reaction product of 1) a lacunary form of a polyoxometalate and 2) a silane of the general formula $CR^2{}_2=C(R^2)R^3SiR^4{}_nZ_{3-n}$, wherein n is 0 or 1, each $R^2$ is individually selected form the group consisting of the hydrogen atom and unsubstituted and substituted monovalent hydrocarbon radicals, $R^3$ represents a single bond or an alkylene radical, $R^4$ represents an unsubstituted monovalent hydrocarbon radical free of ethylenic unsaturation, Z represents a hydrolyzable group, said polyoxometalate structures exhibit a valence of $x^-$ and a general formula selected from the group consisting of $XM_{11}O_{39}{}^{x-}$, $X'MgO_{34}{}^{x-}$ and $X''_2W_{17}O_{61}{}^{x-}$; M is tungsten, or molybdenum, W is tungsten, X is selected from the group consisting of $Si^{4+}$, $B^{+3}$, $Ge^{+4}$, $p^{+5}$, $Fe^{+3}$, $As^{+5}$; X' is selected from the group consisting of $Si^{+4}$, $p^{+5}$ and $As^{+5}$; and the cation associated with said structures is selected from the group consisting of hydrogen, alkali metals and $R^5{}_4N^+$, wherein each $R^5$ represent a monovalent hydrocarbon radical.

9. A method according to claim 8 where said polyorganosiloxane contains at least one silicon-bonded hydrogen atom per molecule, $R^2$ is hydrogen, and $R^4$ is an alkyl radical containing from 1 to 4 carbon radicals, $R^3$ is a single bond, Z represents an alkoxy group containing from 1 to 4 carbon atoms, the anionic portion of the polyoxometalate is $SiW_{11}O_{39}{}^{8-}$, said cation is hydrogen, potassium, or $R^5{}_4N^+$ where $R^5$ represents an alkyl radical containing from 1 to 12 carbon atoms, and the reaction between said polyorganosiloxane and said reaction product is conducted in an organic solvent as the reaction medium and at a temperature from ambient to the boiling point of the reaction medium.

10. A method for preparing an organosiloxane compound containing pendant polyoxometalate structures, said method comprising reacting a polyorganosiloxane containing at least one alkenyl radical with the reaction product of 1) a lacunary form of a polyoxometalate and 2) a silane of the general formula $HSiR^4{}_nZ_{3-n}$, wherein n is 0 or 1, $R^4$ represents an unsubstituted or substituted monovalent hydrocarbon radical free of ethylenic unsaturation, Z represents a hydrolyzable group, the anionic portion of said structures exhibit a valence of $x^-$ and a general formula selected from the group consisting of $XM_{11}O_{39}0^{x-}$, $X'M_9O_{34}{}^{x-}$ and $X''_2W_{17}O_{61}{}^{x-}$, M is tungsten or molybdenum, W is tungsten, X is selected from the group consisting of $Si^{+4}$, $B^{+3}$, $Ge^{+4}$, $p^{+5}$, $Fe^{+3}$, and $As^{+5}$; X' is selected from the group consisting of $Si^{+4}$, $p^{+5}$ and $Ge^{+4}$, X'' is selected form the group consisting of $p^{+5}$ and $As^{+5}$, and the cation associated with said structures is selected from the group consisting of hydrogen, alkali metals and $R^5{}_4N+$, wherein each $R^5$ represents a monovalent hydrocarbon radical.

11. A method according to claim 10 where said polyorganosiloxane contains at least one silicon-bonded alkenyl radical per molecule, Z represents an alkoxy group containing from 1 to 4 carbon atoms, the anionic portion of the polyoxometalate is $SiW_{11}O_{39}{}^{8-}$, said cation is hydrogen, potassium, or $R^5{}_4N^+$ where $R^5$ represents an alkyl radical containing from 1 to 12 carbon atoms, and the reaction between said organosiloxane compound and said reaction product is conducted in an organic solvent as the reaction medium and at a temperature from ambient to the boiling point of the reaction medium.

* * * * *